United States Patent [19]
Tohanczyn, Jr.

[11] Patent Number: 5,823,821
[45] Date of Patent: Oct. 20, 1998

[54] APPARATUS FOR SECURING AN ELECTRICAL OUTLET TO AN OUTLET BOX HAVING STRIPPED THREADS

[76] Inventor: Edward Tohanczyn, Jr., 313 Mecray La., Maple Shade, N.J. 08052

[21] Appl. No.: 828,702

[22] Filed: Mar. 31, 1997

[51] Int. Cl.⁶ .................................................. H02G 3/08
[52] U.S. Cl. ............................... 439/538; 220/3.2; 174/53
[58] Field of Search ..................... 439/538, 539, 439/92; 220/3.2–3.7; 174/53, 58; 411/175, 437, 436, 180, 918, 908, 970, 971, 548, 523, 173

[56] References Cited

U.S. PATENT DOCUMENTS

| | | | |
|---|---|---|---|
| 4,012,580 | 3/1977 | Arnold | 220/3.2 |
| 4,069,448 | 1/1978 | Gernhardt | 220/3.2 |
| 4,071,158 | 1/1978 | Maheu | 220/3.2 |
| 4,105,862 | 8/1978 | Hoehn | 174/53 |
| 4,214,667 | 7/1980 | Lass | 220/3.2 |
| 4,306,109 | 12/1981 | Nattel | 220/3.2 |
| 4,392,012 | 7/1983 | Nattel | 439/92 |
| 4,580,689 | 4/1986 | Slater | 220/3.2 |
| 4,679,882 | 7/1987 | Mears | 439/569 |
| 4,770,311 | 9/1988 | Wang | 220/3.2 |
| 4,955,772 | 9/1990 | Reck | 411/175 |

*Primary Examiner*—Neil Abrams
*Assistant Examiner*—Brian J. Biggi
*Attorney, Agent, or Firm*—David L. Volk

[57] ABSTRACT

A retaining clip includes a first plate having a first end opposite a second end. The first plate is turned at the second end to form at least one second plate which extends back toward the first end. The first plate is also turned at the second end to form a tab which extends substantially perpendicularly from the first plate and includes a threaded aperture there-through.

7 Claims, 3 Drawing Sheets

APPARATUS FOR SECURING AN ELECTRICAL OUTLET TO AN OUTLET BOX HAVING STRIPPED THREADS

BACKGROUND OF THE INVENTION

1. Field of the Invention

The present invention relates to electrical construction supplies, specifically to a device for securing an electrical outlet or switch to an outlet box having stripped threads.

2. Description of the Related Art

Outlet boxes are used in the fields of construction and home improvement wherever a switch or electrical outlet is installed. The outlet box is constructed of metal or plastic, and includes a method of fastening to a wall stud. The outlet box also includes knock-out holes for wiring to enter the box. Within the box, the installer will make wiring connections to an electrical switch or outlet, and then screw the switch or outlet to threaded connections on the box. To finish the project, the installer will then screw a switch or outlet plate to the switch or outlet.

If the threaded connections on the outlet box become stripped or otherwise unusable, the box becomes unusable, or unsafe if used. What is needed is an apparatus which will permit an electrical receptacle or switch to be secured to an outlet box having stripped threads. This will permit these boxes to be safely reused, instead of thrown away.

SUMMARY OF THE INVENTION

The retaining clip of the present invention includes a first plate having a first end opposite a second end. The first plate is turned at the second end to form at least one second plate which extends back toward the first end. The first pate is also turned at the second end to form a tab which extends substantially perpendicularly from the first plate and includes a threaded aperture there-through. The retaining clip may be placed over a wall of an outlet box such that the wall is snugly received between the first and second plates and the threaded aperture aligns with a stripped female threaded connection. This permits an electrical outlet to be threadedly connected to the threaded aperture instead of to the stripped female connection.

Accordingly, several objects and advantages of the present invention are:

a. to provide a retaining clip which permits an electrical outlet or switch to be connected to an outlet box having stripped threads;

b. to provide a retaining clip which is inexpensive to manufacture and to purchase;

c. to provide a retaining clip which results in a safe electrical installation; and d. to provide a retaining clip which can be installed quickly and easily on an outlet box.

Still further objects and advantages will become apparent from the ensuing description and drawings.

DETAILED DESCRIPTION

Figure 1:
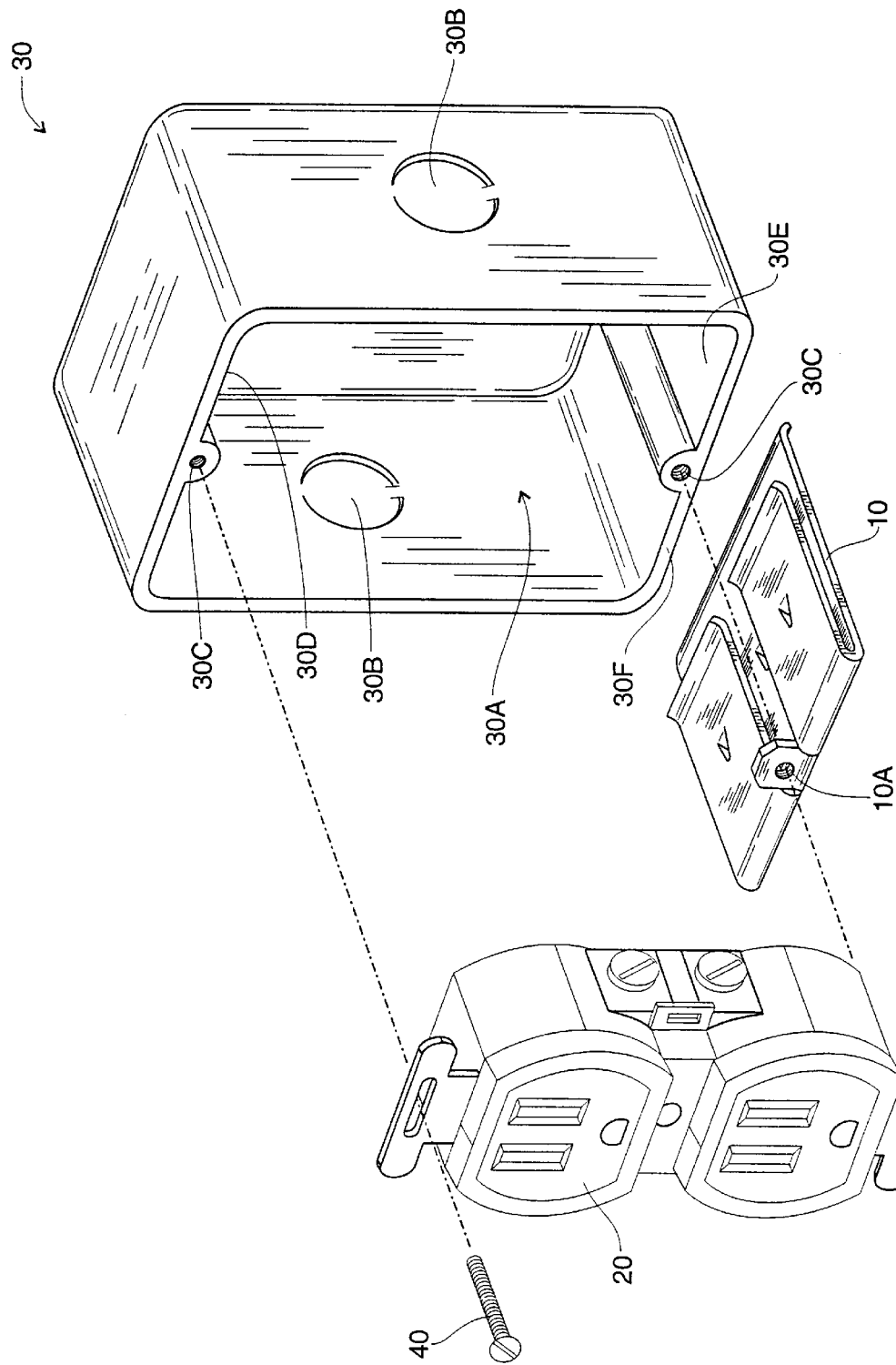
FIG. 1 is an exploded perspective view showing the connection of an electrical outlet to an outlet box, using the retaining clip of the present invention.

FIG. 1 is an exploded perspective view showing the connection of a conventional electrical outlet 20 to a conventional outlet box 30 having stripped threads, using a retaining clip 10. Conventional outlet boxes 30 are substantially box shaped, having a single open side 30A and knockouts 30B through which electrical wiring may enter the box 30. Additionally, the box 30 includes a female threaded connection 30C at a top end 30D and at a bottom end 30E.

Normally, the outlet 20 or a switch (not shown) is directly threadedly connected to the female threaded connections 30C of the box 30, using screws 40. If either of the threaded connections 30C of the box 30 should become stripped, the retaining clip 10 may be attached to the box 30 such that a threaded aperture 10A of the retaining clip 10 is positioned in front of the stripped threaded connection 30C, and the outlet 20 may be threadedly connected to the threaded aperture 10A.

Figure 2:
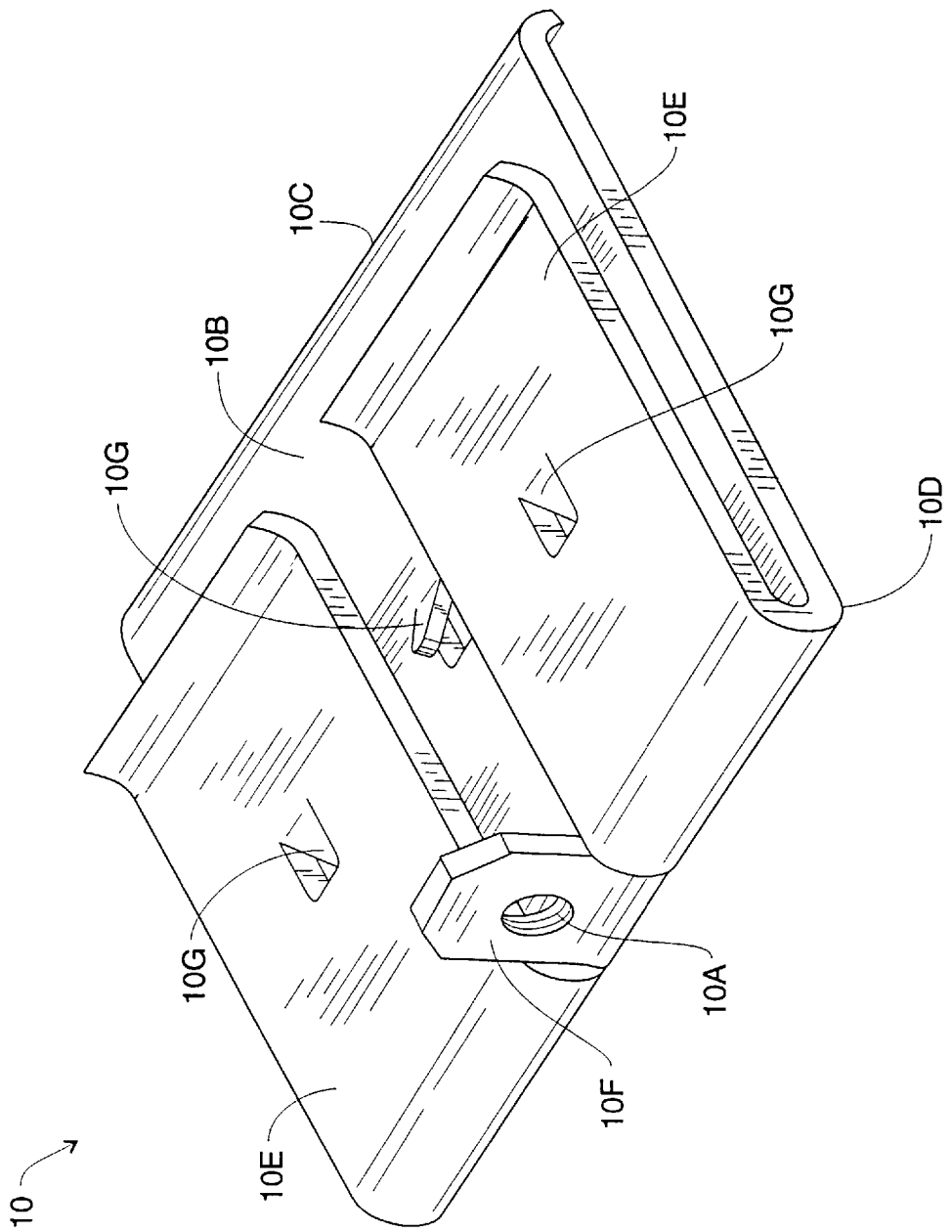
FIG. 2 is a perspective view of the retaining clip, shown apart from the outlet box.

FIG. 2 is a perspective view of the retaining clip 10, shown apart from the outlet box 30. The retaining clip 10 comprises a first plate 10B having a first end 10C opposite a second end 10D. The first plate 10B is turned at the second end 10D to form at least one second plate 10E which extends from the second end 10D back toward the first end 10C. The first plate 10B and the second plate 10E may include at least one inwardly protruding prong 10G formed therein.

The first plate 10B is also turned at the second end 10D to form a tab 10F which extends substantially perpendicularly from the first plate 10B, and includes the threaded aperture 10A there-through.

Figure 3:
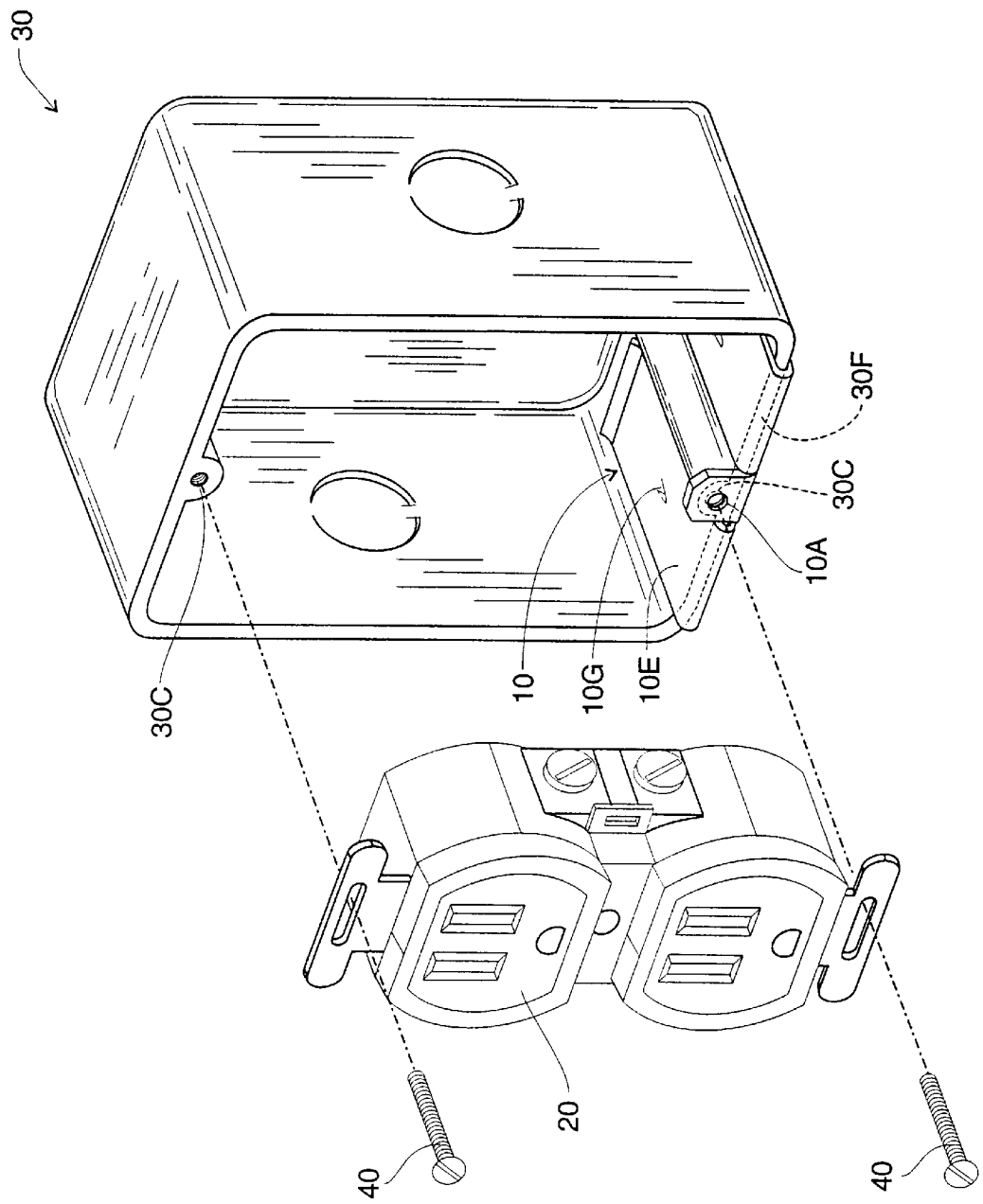
FIG. 3 is an exploded perspective view similar to FIG. 1, except that it shows the retaining clip attached to the outlet box.

P FIG. 3 is an exploded perspective view similar to FIG. 1, except that it shows the retaining clip 10 attached to the outlet box 30. The retaining clip 10 is placed over a wall 30F of the box 30 such that the wall 30F is snugly received between the first and second plates 10B, 10E, and the threaded aperture 10A is aligned with the stripped female threaded connection 30C. The electrical outlet 20 may then be threadedly connected to the threaded aperture 10A and to the remaining un-stripped female threaded connection 30C, thus securing the electrical outlet 20 to the box 30. If the inwardly protruding prongs 10G are included, they will help to ensure a secure attachment of the retaining clip 10 to the box 30.

The foregoing description is included to describe embodiments of the present invention which include the preferred embodiment, and is not meant to limit the scope of the invention. From the foregoing description, many variations will be apparent to those skilled in the art that would be encompassed by the spirit and scope of the invention. For example, the number, location and distribution of the prongs 10G may vary. The prongs 10G may be on both the first plate 10B and the second plate 10E, or may be on only one of the plates 10B, 10E. The scope of the invention is to be limited only by the following claims and their legal equivalents.

The invention claimed is:

1. A retaining clip for attachment to a conventional electrical outlet box, the clip comprising:

a. a first plate having a first end opposite a second end;

b. the first plate turned at the second end to form at least one second plate which extends back toward the first end; and c. the first plate turned at the second end to form a tab which extends substantially perpendicularly from the first plate and includes a threaded aperture there-through.

2. The retaining clip of claim 1, wherein such a conventional outlet box includes a conventionally configured and positioned female threaded connection, and wherein the clip is configured such that the first plate and the second plate may snugly receive a wall of such a conventional outlet box there-between, and the threaded aperture may align with such a female threaded connection.

3. The retaining clip of claim 1, wherein the first plate includes at least one inwardly protruding prong formed therein.

4. The retaining clip of claim 1, wherein the second plate includes at least one inwardly protruding prong formed therein.

5. The retaining clip of claim 1, wherein the second plate spans at least two thirds of the distance between the first end and the second end of the first plate.

6. The retaining clip of claim 5, wherein the first plate and the second plate are each turned outwardly, away from each other at the first end of the first plate.

7. The retaining clip of claim 5, wherein the second plate is positioned between a distal end of the tab and the first plate.

* * * * *